United States Patent [19]

Poque et al.

[11] Patent Number: 5,107,333

[45] Date of Patent: Apr. 21, 1992

[54] BISPECTRAL PICK-UP AND FALSE COLOR DISPLAY SYSTEM

[75] Inventors: Jean L. Poque, Antony; Claude Gillet, Montreuil, both of France

[73] Assignee: Thomson-CSF, Puteaux, France

[21] Appl. No.: 555,648

[22] Filed: Jul. 23, 1990

[30] Foreign Application Priority Data

Aug. 8, 1989 [FR] France .................. 89 10663

[51] Int. Cl.$^5$ .................. H04N 5/33; H04N 7/18
[52] U.S. Cl. .................. 358/113; 358/108; 358/48
[58] Field of Search .................. 358/113, 110, 108, 48; 250/330

[56] References Cited

U.S. PATENT DOCUMENTS

| | | | |
|---|---|---|---|
| 3,571,504 | 3/1971 | Kiuchi et al. | 358/113 |
| 4,118,733 | 10/1978 | Sarson et al. | 358/109 |
| 4,524,386 | 6/1985 | Scott | 358/113 |
| 4,608,599 | 8/1986 | Kaneko et al. | 358/96 |
| 4,678,069 | 7/1987 | Lillquist | 358/113 |
| 4,751,571 | 6/1988 | Lillquist | 358/113 |
| 4,759,072 | 7/1988 | Yamane et al. | 358/113 |
| 4,843,561 | 6/1989 | Larson | 358/113 |
| 4,967,276 | 10/1990 | Murakami et al. | 358/113 |

FOREIGN PATENT DOCUMENTS 2612030 9/1988 France .

*Primary Examiner*—John K. Peng
*Attorney, Agent, or Firm*—Oblon, Spivak, McClelland, Maier & Neustadt

[57] ABSTRACT

A bispectral pick-up and false color display system which comprises a bispectral camera for analyzing a picture in the visible range and a picture in the infrared range, and outputting two respective video signals, one for the visible range and one for the infrared range. A mixer then mixes these two video signals and derives, therefrom, three color control signals, each color control signal being a linear combination of the two video signals given by the bispectral camera. A manual setting device then sets or adjusts the coefficients of each of the combinations. A standard color television monitor then can display a picture as a function of the three color control signals. The disclosed device can be applied to target-sighting and target-tracking devices for land vehicles.

5 Claims, 4 Drawing Sheets

BISPECTRAL PICK-UP AND FALSE COLOR DISPLAY SYSTEM

BACKGROUND OF THE INVENTION

1. Field of the Invention

The invention concerns a bispectral pick-up and false color display system, applicable notably to the sighting and tracking of targets.

For such an application, video recording cameras generally use a silicon sensor that has the advantage of withstanding strong illumination and of having spectral sensitivity that extends from the visible range of the spectrum up to the near infrared range of the spectrum. Experience has shown that the visible range, extending from the 0.4 to 0.7 micron wavelengths, and the near infrared range, extending from the 0.7 to the 1 micron wavelengths, must be used separately for the following reasons.

The fact of crossing the atmosphere on the path between the observed scene and the camera causes light rays to undergo an attenuation and a reduction in their contrast. The attenuation is not the same for all wavelengths, and it depends on atmospheric conditions, namely atmospheric visibility, the nature of the aerosols in suspension in the atmosphere, etc. In many cases, the infrared rays are less attenuated than the visible rays. The reduction in contrast is due to the scattering of light by particles suspended in the atmosphere. The reduction in contrast also depends on atmospheric conditions, and the visible and infrared rays are not affected by the same reduction in contrast.

The scene observed is itself different depending on whether it is observed in the infrared range or in the visible range. The contrast between a target and the background of the picture may be different in these two ranges or regions of the spectrum. If, as is very common, the background consists of vegetation, then the contrast consistently bears the opposite sign in these two ranges. For example, a concrete structure surrounded by grass will appear as being bright against a dark background in the visible range, and it will appear as being dark against a bright background in the infrared range.

However, observation in the visible range of the spectrum and observation in the infrared range are each useful. Depending on the atmospheric conditions, and on the scene observed, it will be more useful to observe the scene in one range or in the other.

Because of the reversal of contrast, in the vicinity of the 0.7 wavelength, one and the same sensor cannot be used for both these regions of the spectrum, otherwise, the picture obtained has a contrast which is the mean of the contrasts in the two ranges, i.e. a very low contrast. A silicon sensor therefore cannot be used in its entire range of sensitivity.

2. Description of the Prior Art

In a standard way, the video cameras used in weapons systems are fitted out with a switch-over filtering device. The operator has a hand-operated control which can be used to filter either the visible rays or the infrared rays. The operator makes this choice as a function of the picture that he observes on the screen of a monochrome monitor, in seeking the best contrast. In practice, the operator does not always have the time nor is it possible for him to review the choice that he has made a few minutes before. However, if the distance between the camera and the target has changed, the maximum contrast may no longer be in the spectral field that was chosen. At a long distance, the attenuation of the light beams and the degradation of their contrast by the scattered light are more moderate in the infrared range. By contrast, if the camera approaches the target, it can happen that the contrast becomes greater in the visible range.

When the distance varies swiftly, it is complicated to change the filtering. In standard systems, the change in the filtering causes a brief loss of pictures which may possibly cause an automatic target-tracking operation, being performed by this camera, to get unlocked. In practice, the user does not take this risk and therefore keeps the same filtering mode.

To use the visible range and the infrared range simultaneously, it is possible to envisage the making of a system that has a bispectral camera to analyze a picture in the visible range and a picture in the infrared range, and has two monochrome monitors placed side by side. However, this system is too slow and too tiring for the operator.

It is also possible to envisage the use of a single monochrome monitor receiving a video signal obtained by the linear combination of the two video signals given by the camera. Experience shows that the displayed picture is flat, for the contrasts in intensity in the two ranges compensate for each other more or less, at the instant when the signals are combined.

SUMMARY OF THE INVENTION

It is an aim of the invention to propose a system enabling the display, on a single monitor, of a picture obtained by the simultaneous exploitation of the infrared range and the visible range, despite the reversals in contrast between these two ranges.

An object of the invention is a pick-up system comprising: a bispectral camera giving two video signals, and a mixer making three linear combinations of these three signals, to give three color signals to a standard color television monitor. The monitor displays a picture equivalent to the sum of an ocher-colored picture representing a view in the near infrared range and a sapphire-blue picture representing the same view but in the visible range. The monitor simultaneously displays details corresponding to the visible range and details corresponding to the infrared range, without mutual compensation by the contrasts, and this is achieved through the difference in color. This system enables the operator to pinpoint targets more swiftly than in the standard systems, since it enables better perception of the small details. It also enables the different planes of the observed scene to be separated more efficiently, and therefore enables a clearer appreciation of the relative distances of the different elements of the scene.

According to the invention, there is proposed a bispectral pick-up and false color display system comprising:

means to analyze a picture in the visible range and means to analyze a picture in the infrared range, giving a first video signal and a second video signal, corresponding respectively to these two ranges;

means to mix these two video signals and to derive, therefrom, three signals, known as color signals, each being a linear combination of the first two video signals, to which adjustable coefficients are assigned;

means to adjust or set the coefficients of each of the combinations;

means to display a color picture, by the addition of three primary colors, controlled by the three color signals.

BRIEF DESCRIPTION OF THE DRAWINGS

The invention will be understood more clearly and other details will appear from the following description and the accompanying figures, of which.

DETAILED DESCRIPTION OF THE PREFERRED EMBODIMENT

Figure 1:
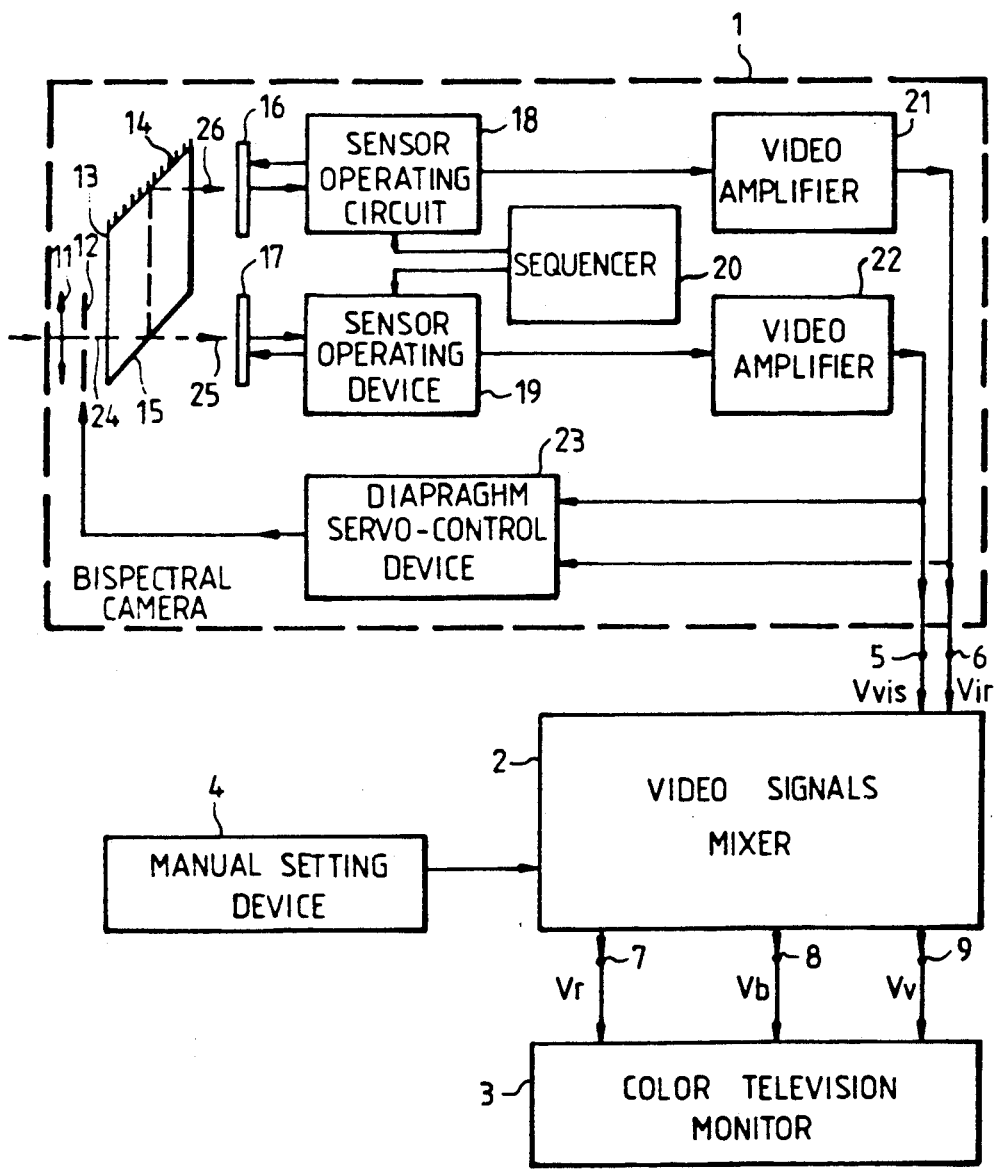
FIG. 1 shows the block diagram of an exemplary embodiment of the system according to the invention.

The exemplary embodiment shown in FIG. 1 includes: a bispectral camera 1, a video signals mixer 2, a color television monitor 3 and a manual setting device 4

The monitor 3 is a standard monitor, with a cathode-ray tube (which is a mask cathode-ray tube for example), enabling the reproduction of practically all the colors from three primary colors: red, green, blue.

The bispectral camera 1 has: an input objective 11, an adjustable diaphragm 12, a separator 13, two charge-transfer matrix sensors 16, 17, made of silicon, two circuits 18 and 19 for operating the sensors, a sequencer 20, two video amplifiers 21 and 22, and a device 23 for the servo-control of the diaphragm.

The separator 13 is formed by a glass polygon having: a face 15 inclined by 45 degrees with respect to the optical axis of the objective 11 and the diaphragm 12, coated with a dichroic deposit reflecting the infrared rays and letting through the visible rays; and a face 14, parallel to the face 15 and coated with a metal deposit forming a mirror. The separator 13 separates a light beam received by the camera into two parallel beams, 26 and 25, respectively formed by infrared rays and visible rays. These two beams form two pictures respectively on the two sensors 16 and 17.

The circuits 18 and 19 have first inputs, respectively connected to outputs of the sensors 16 and 17, and second inputs connected to outputs of the sequencer 20 which gives them clock signals. The sensors 16 and 17 give the circuits 18 and 19 two signals corresponding respectively to the intensity of the infrared rays and to the intensity of the visible rays. First outputs of the circuits 18 and 19 are connected respectively to inputs of the sensors 16 and 17 to give them control signals needed for the operation of these sensors. The circuits 18 and 19 are adapted to the type of sensors used, and are built in a standard way.

Second outputs of the circuits 18 and 19 are connected respectively to inputs of the video amplifiers 21 and 22. These video amplifiers have outputs connected respectively to output terminals 5 and 6 of the camera 1, and they give, respectively, video signals Vvis and Vir representing one and the same view analyzed, respectively, in the visible range and in the infrared range. The device 23 for the servo-control of the diaphragm has two inputs, connected respectively to the two outputs of the video amplifiers 21 and 22, and an output controlling an electromechanical device for adjusting or setting the diaphragm 12, so as to obtain accurate luminosity both at the sensor 16 and at the sensor 17.

The output terminals 5 and 6 are connected respectively to two inputs of the mixer 2. This mixer 2 further has an input connected to a manual setting device 4, and three output terminals 7 to 9, respectively connected to three inputs of the monitor 3. The mixer 3 gives three signals through these three output terminals. These three signals, Vr, Vb, Vv, called color signals, are designed to control the intensity of the color red, the intensity of the color blue and the intensity of the color green, for each picture element reproduced on the screen of the monitor 3.

These three signals are each formed by a linear combination of the two signals Vvis and Vir. The coefficients of the three linear combinations can be set by means of the device 4. Two exemplary embodiments of the mixer 2 are described further below.

Figure 2:
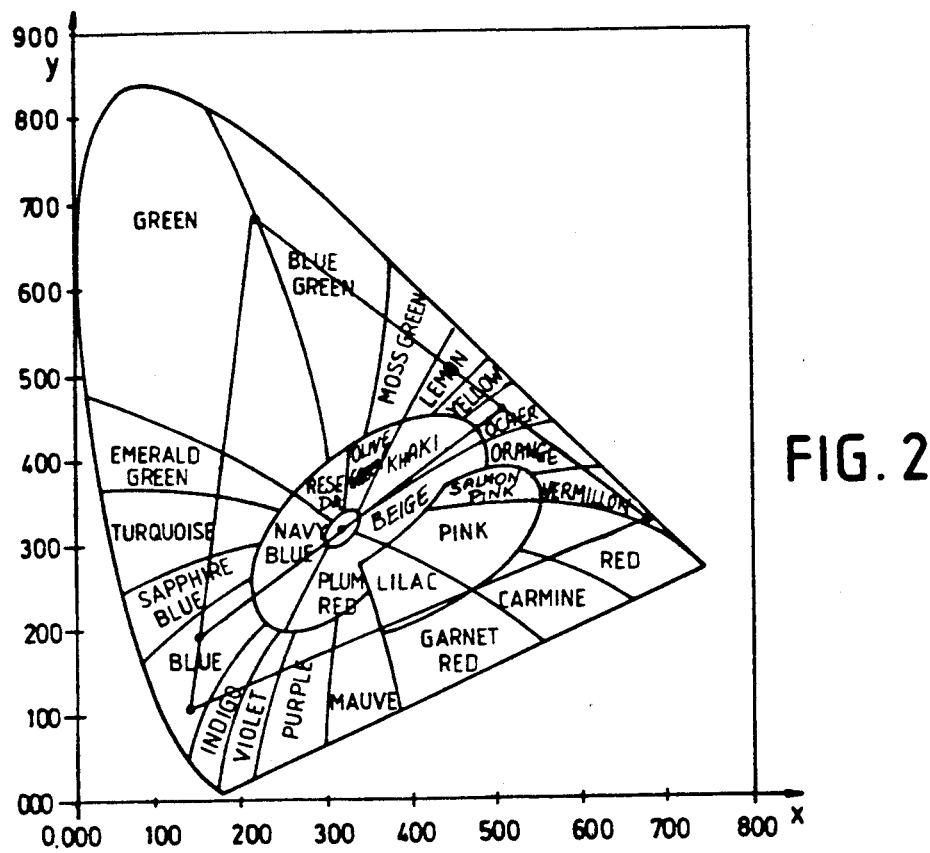
FIGS. 2 and 3 shows two diagrams illustrating the working of the system according to the invention.

FIG. 2 shows a diagram prepared by the International Commission on Illumination. This diagram uses a two-dimensional reference system to show all the colors existing in the visible range. It has three points identifying three primary colors standardized to reproduce color television pictures. These three points are located respectively: at the borderline between green and blue-green, at the borderline between vermillion and red; and in the blue. These three points define a triangle containing all the colors that can be obtained by mixing these three colors in variable proportions.

The cathode-ray tubes conventionally used in color television monitors have three types of luminophors respectively emitting three colors corresponding, with a near likeness, to the three points fixed by the International Commission on Illumination. When the luminophors of all three types are excited equally, the addition of the three colors emitted produces the color white which is represented at the center of the triangle.

The picture obtained on the monitor 3, by means of the mixer 2, should bring out both the information contained in the visible rays and the information contained in the infrared rays but, in addition, this picture should not disturb the eye by a depiction that is too far removed from the natural colors. For example, trees in blue and the sky in green would make for a disturbing picture. Besides, it is not possible to use two of the primary colors (red, green, blue) directly, as this would lead to an imbalance in definition, for the eye is less sensitive in the blue and red ranges than in the green.

Finally, the use of only two primary colors, for example red and blue, would not allow white to be obtained, and would give a picture in which the false colors are disturbing since they are too far removed from the real colors.

Figure 3:
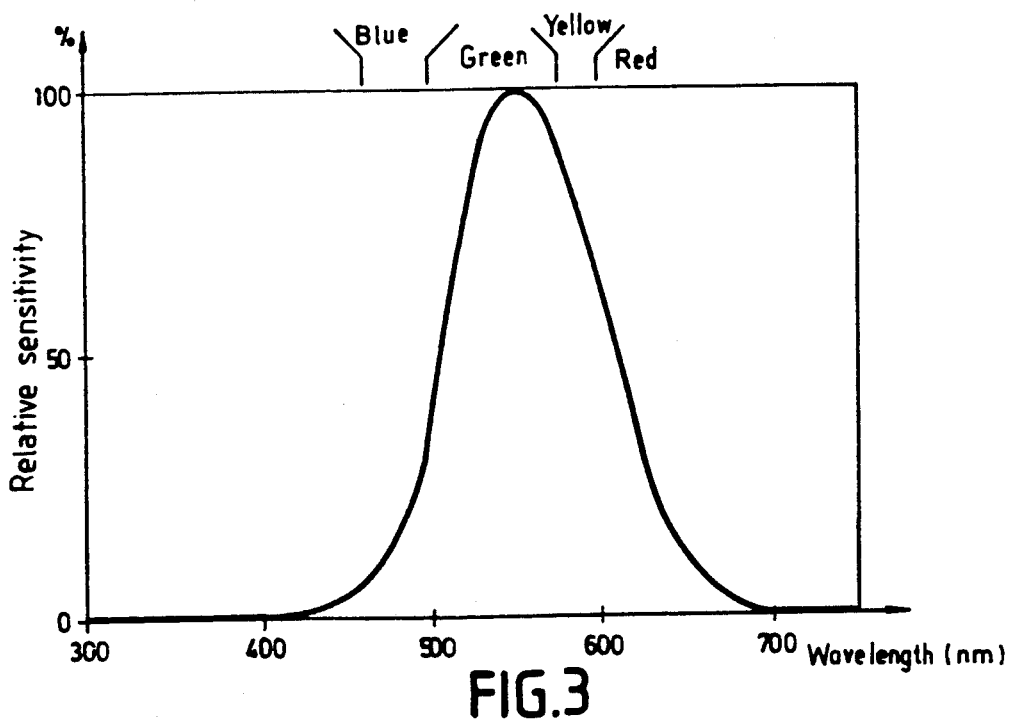

FIG. 3 is a graph showing the relative sensitivity of the eye as a function of the wavelength. This graph shows that the sensitivity of the eye is very high for the colors green and yellow, and appreciably lower for the colors blue and red. Moreover, if a lengthy observation is not to be a tiring one, the picture displayed by the monitor should be pastel colored. A pastel-colored picture is very close to a real picture obtained at a distance of several kilometers, for a distance such as this has the effect of washing out the colors.

To obtain green-yellow pastel-colored pictures, the system according to the invention displays a picture that is equivalent to the addition of two pictures having respectively two colors that are different from the three standard primary colors: red, green, blue. A first color is ocher and a second color is at the borderline between blue and sapphire. The ocher-colored picture reproduces the infrared rays while the sapphire-blue colored picture reproduces the visible rays. The resulting picture is displayed on a standard television in using the three standard primary colors. The ocher is therefore obtained by mixing red and green, while the sapphire-blue is obtained by mixing blue with a small amount of green. As shown in FIG. 2, the white can be obtained by combining ocher with sapphire-blue. The displayed picture can therefore have white zones: this is particularly important for obtaining a picture close to reality.

The mixer 2, in this embodiment, determines the three color signals according to the following formulae:

$$Vr = (1-k) \times 0.3 \times Vir \quad (1)$$

$$Vv = k \times 0.3 \times Vis + (1-k) \times 0.7 \times Vir \quad (2)$$

$$Vb = k \times 0.7 \times Vvis \quad (3)$$

where k is a number variable between 0 and 1, as a function of the manual setting done by the device 4. When the manual setting is in a median position, k is equal to 0.5. In this case, the picture displayed is colored sapphire-blue when the value of the video signal Vvis is not zero and the value of the video signal Vir is zero. And the picture displayed is colored ocher when the value of the video signal Vir is not zero and the value of the video signal Vvis is zero. In practice, since the values of both signals are not zero, the displayed picture includes all the shades between sapphire-blue and ocher, in passing through white. The contrasts in the sapphire-blue colored picture do not compensate for the contrasts in the ocher colored picture, thus enabling the observation of the contrasts in the infrared rays as well as the contrasts in the visible rays.

Figure 4:
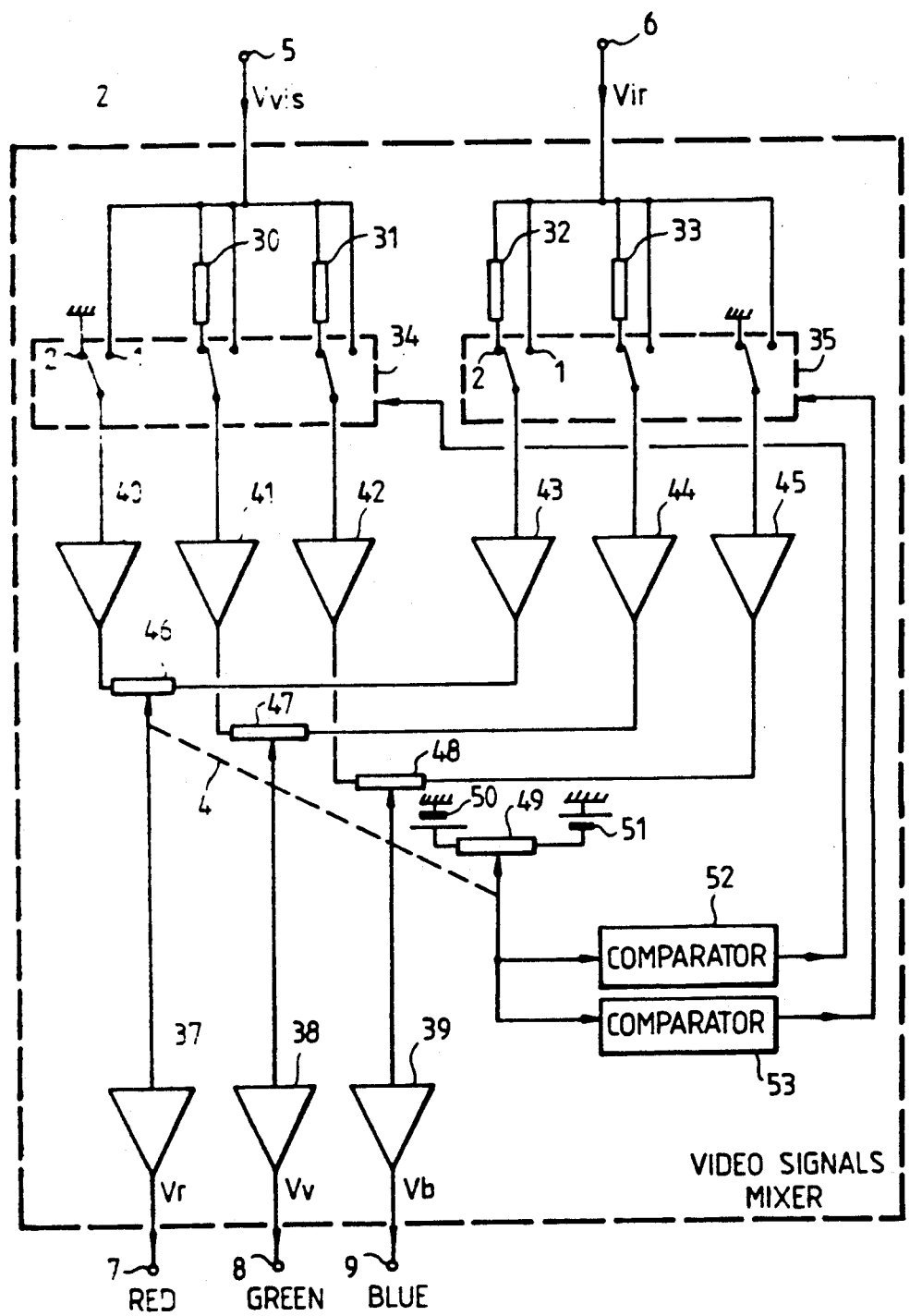
FIG. 4 shows the block diagram of a first embodiment of a part of the exemplary embodiment presented in FIG. 1.

FIG. 4 shows a first embodiment of the mixer 2. This embodiment is of the analog type. It has: four resistors 30 to 33; two multiplexers 34 and 35, each having six data inputs, three outputs and one control input; nine identical amplifiers 37 to 45; four potentiometers 46 to 49, having the same resistance value and having their respective sliding contacts controlled by one and the same pin, two DC voltage generators 50 and 51, and two comparators 52 and 53.

The coefficients k and 1−k are determined by setting the potentiometers 46 to 48. In this exemplary embodiment, there is provision for automatically limiting the setting range of the coefficient k between 0.3 and 0.7, by the performance of switch-over operations such that the picture displayed on the monitor 3 becomes a monochromatic black-and-white picture when the manual setting goes beyond the positions corresponding to these two values of k.

Thus, when the manual setting 4 favors viewing in the infrared range, the picture displayed becomes a monochromatic black-and-white picture instead of a monochromatic ocher colored picture. When the manual setting 4 favors viewing in the visible range, the picture displayed is a monochromatic black-and-white picture instead of being a monochromatic blue colored picture. This automatic switching thus enables a more pleasant picture to be observed when the observer favors one of the two ranges of radiation.

In this exemplary embodiment, an additional potentiometer 49 is used to detect the position of the manual setting 4. The two ends of the potentiometer 49 are connected respectively to the voltage generators 50 and 51, which give DC voltages that are symmetrical with respect to a reference potential. The sliding contact of the potentiometer 49 is connected to inputs of the comparators 52 and 53 to compare the voltage given by the sliding contact with two pre-determined threshold voltages, corresponding respectively to two positions such that k=0.3 and k=0.7.

The comparators 52 and 53 have two outputs, respectively connected to a control input of the multiplexer 34 and to a control input of the multiplexer 35. The comparator 52 activates a change in the state of the multiplexer 34 when the position of the setting 4 corresponds to a value k greater than 0.7. The comparator 53 activates a change in the state of the multiplexer 35 when the position of the setting 4 corresponds to a value k smaller than 0.3.

The detection of these two extreme positions of the manual setting 4 can equally well be done by means of two switches activated by the pin common to the potentiometers 46 to 48.

The multiplexer 34 and the multiplexer 35 respectively have three first inputs that are respectively connected to the three outputs when the multiplexer 34 is in a first state referenced 1 in FIG. 4, and it connects three second inputs to the three outputs, in a second state referenced 2. The multiplexers 34 and 35 are shown in FIG. 4 in this second state, which corresponds to the display of a picture representing simultaneously the visible range and the infrared range.

Let us successively consider the means used to determine; a red signal Vr, a green signal Vv and a blue signal Vb. The output terminal 7, which gives the red signal Vr, is connected to the output of the amplifier 37, the input of which is connected to the sliding contact of the potentiometer 46. The two ends of the potentiometer 46 are connected respectively to the outputs of the amplifiers 40 and 43. The input of the amplifier 40 is connected to a first output of the multiplexer 34 while the input of the amplifier 43 is connected to a first output of the multiplexer 35. In its second state, the multiplexer 34 connects its first output to the reference potential. In its second state, the multiplexer 35 connects its first output to an end of the resistor 32. The other end of the resistor 32 is connected to the input terminal 6 which receives the signal Vir.

The amplifiers 37 to 45 all have the same gain, for example equal to one, and all have the same input resistance value. The coefficients of the linear combinations of the signals Vvis and Vvir are obtained by means of the resistors 30 to 33, in association with the input resistors of the amplifiers 41 to 44. To obtain the red signal, a zero value signal is applied to the input of the amplifier 40 and the signal Vir is applied to the input of the amplifier 43 with an attenuation equal to 0.3, achieved by the resistor 32 and the input resistor (not shown) of the amplifier 43. The sliding contact of the potentiometer 46 therefore gives a signal in accordance with the formula (1). The amplifier 37 transmits this signal to the output terminal 7, with a low output resistance.

The green signal Vv is given by the output terminal 8 which is connected to the output of the amplifier 38. The input of this amplifier 38 is connected to the sliding contact of the potentiometer 47. The two ends of the potentiometer 47 are connected respectively to the outputs of the amplifiers 41 and 43. When the multiplexer 34 is in its second state, it connects its second output to an input to which a first end of the resistor 30 is connected. A second end of the resistor 30 is connected to the input terminal 5. The signal Vvis undergoes an attenuation equal to 0.3 in the attenuator formed by the resistor 30 and the input resistor (not shown) of the amplifier 41. When the multiplexer 35 is in its second state, its second output connects the input of the amplifier 44 to a first end of the resistor 33. The second end of the resistor 33 is connected to the input terminal 6. The signal Vir undergo an attenuation equal to 0.7 in the attenuator formed by the resistor 33 and by the input resistor (not shown) of the amplifier 44. Thus, the signal given by the sliding contact of the potentiometer 47 is in accordance with the formula (2). The amplifier 38 transmits this signal to the output terminal 8, with a low output resistance.

The blue signal Vb is given by the output terminal 9 which is connected to the output of the amplifier 39. The input of this amplifier 39 is connected to the sliding contact of the potentiometer 48. The two ends of the potentiometer 48 are connected respectively to the outputs of the amplifiers 42 and 45. An input of the amplifier 42 and an input of the amplifier 45 are connected respectively to the third output of the multiplexer 34 and to the third output of the multiplexer 35. When the multiplexer 34 is in its second state, it connects its third output to a first end of the resistor 31. A second end of the resistor 31 is connected to the input terminal 5. Thus, the signal Vvis undergoes an attenuation equal to 0.7 in the attenuator formed by the resistor 31 and by the input resistor (not shown) of the amplifier 42. When the multiplexer 35 is in its second state, it connects its third output to the reference potential. The sliding contact of the potentiometer 48 thus gives a signal in accordance with the formula (3). The amplifier 39 transmits this signal to the output terminal 9, with a low output resistance.

When the setting is such that k is smaller than 0.3, the comparator 52 activates the multiplexer 35 so that it goes into its first state. It then directly connects the input terminal 6 to the inputs of the amplifiers 43 to 45. The three signals given by the sliding contacts of the potentiometers 46 to 48 are then practically identical to the signal Vir. They make it possible to obtain three signals Vr, Vb, Vv, practically identical to Vir, in order to display a monochromatic picture that is black and white and not ocher, to observe the infrared range only.

In the same way, when the setting is such that k is greater than 0.7, the comparator 53 activates the multiplexer 34 so that it goes into its first state. It then directly connects the input terminal 5 to the inputs of the amplifiers 40 to 42. The three signals given by the sliding contacts of the potentiometers 46 to 48 are then practically identical to the signal Vvis. They make it possible to obtain three signals Vr, Vb, Vv, practically identical to the signal Vvis, in order to display a monochromatic picture that is black and white and not sapphire-blue, to observe the visible range only.

Figure 5:
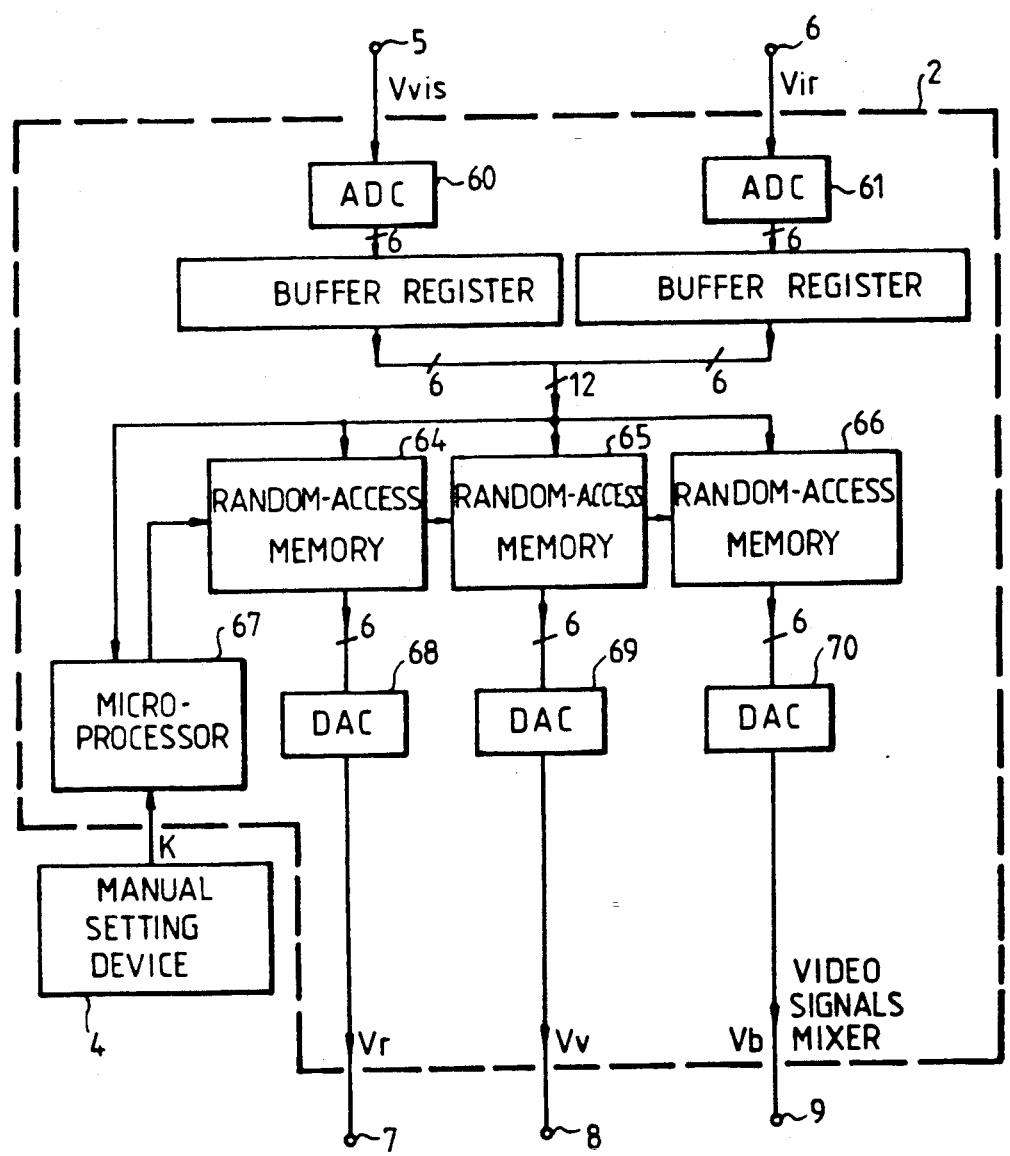
FIG. 5 shows the block diagram of a second embodiment of this part.

FIG. 5 shows the block diagram of another embodiment of the mixer 2. This embodiment is of the digital type. It has: two analog-digital converters 60 and 61, two buffer registers 62 and 63, each storing a six-bit binary word, three random-access memories 64, 65, 66, three digital-analog converters 68, 69, 70 and one microprocessor 67.

The input terminals 5 and 6 are respectively connected to the inputs of the analog-digital converters 60 and 61 which respectively sample the signals Vvis and convert them into six-bit binary words. The outputs of the converters 60 and 61 are connected respectively to data inputs of the buffer registers 62 and 63. The data outputs of the registers 62 and 63 give two six-bit binary words in parallel. These two six-bit binary words constitute a twelve-bit binary word. This twelve-bit binary word is applied simultaneously to an address input of each of the random-access memories 64 to 66, and to an input of the microprocessor 67. Data outputs of the memories 64 to 66 are connected respectively to inputs of the digital-analog converters 68 to 70 to give each of them a six-bit word. Outputs of the converters 68 to 70 are connected respectively to the three output terminals 7, 8, 9 and respectively give them three color signals, Vr, Vv, Vb.

An output of the microprocessor 67 is connected to data inputs and to address inputs of the random-access memories 64 to 66. An input of the microprocessor 67 is connected to an output of a manual setting device 4 which may be formed, for example, by a button and a position sensor giving a binary word that represents the position of the button. All the elements of the mixer 2 receive clock signals given by a standard generator (not shown) of clock signals.

The function of each of the random-access memories 64 to 66 is to store a table which makes a six-bit binary word correspond with a twelve-bit binary word formed by a value of Vir and a value of Vvis. The value of each of these three binary words is given respectively by the equations (1), (2), (3). The values constituting the tables are computed by the microprocessor 67 in accordance with these equations, and then stored in the memories 64 to 66 whenever the manual setting device 4 gives a new value of the coefficient k.

Furthermore, it is provided that there will be a return to the display of a monochromatic black-and-white picture, having only the information provided by the visible rays, when the infrared range contains little information. Conversely, it is provided that there will be an automatic return to the display of a monochromatic black-and-white picture, having only the information provided by the infrared rays, when the visible range has little information. The information contained in the two ranges is studied by computing a histogram of the luminance values of each of the two pictures.

This function is fulfilled by the microprocessor 67 which receives, at one input, each pair of binary six-bit words representing the signals Vvis and Vir. If the histogram of the picture obtained in one of the ranges of the spectrum shows that this picture contains little information, the microprocessor 67 decides to make a black-and-white display of the picture obtained in the other range of the spectrum, provided that the histogram corresponding to the latter picture shows that it contains more information. The microprocessor 67 determines and stores three new tables of values in the memories 66 to 69. These tables are identical to one another and are such that:

$$Vr = Vb = Vv = Vir$$

or $$vr = Vb = Vv = Vis,$$

as the case may be.

The programming of the microprocessor 67 in order to compute the tables, store them in the random-access memories 64, compute the histograms and decide to present the information of the two ranges simultaneously or else to present only the information of a single range, is within the scope of those skilled in the art.

The invention is particularly applicable to target-sighting and target-tracking devices borne by land vehicles.

What is claimed is:

1. A bispectral pick-up and false color display system comprising:

first analyzing means for analyzing a picture in a visible spectral range and for outputting a first video signal representing a first analyzed picture;

second analyzing means for analyzing a picture in an infrared spectral range and for outputting a second video signal representing a second analyzed picture;

mixing means for mixing the first and second video signals and for outputting therefrom three color control signals, each color control signal being a combination of the first and second video signals, wherein adjustable coefficients are assigned to each color control signal;

setting means for setting the coefficients of each of the color control signals; and display means for displaying a color picture, by a combination of three primary colors, respectively controlled by the three color control signals.

2. A system according to claim 1, wherein the color control signals generated by the mixing means are such that, when the setting means for setting the coefficients are set at a central position of their setting range, the displayed picture is:

colored sapphire-blue when a magnitude of the first video signal is not zero and a magnitude of the second video signal is zero;

colored ocher when a magnitude of the second video signal is not zero and a magnitude of the first video signal is zero.

3. A system according to claim 1, wherein the mixing means comprises automatic switching means to output the three color control signals that are practically equal to the video signal corresponding to the visible range and to the infrared range respectively, when the adjustable coefficients reach two predetermined threshold values.

4. A system according to claim 1, wherein the mixing means comprises:

computing means for computing three tables of values of the three color control signals, as a function of a variable value given by the means for setting the coefficients; and storing means for storing the three tables, the storing means having a reading address input receiving an address word formed by a value of each of the two video signals.

5. A system according to claim 4, wherein the mixing means further comprises computation means for, determining a histogram of the first analyzed picture in the visible range and a histogram of the second analyzed picture in the infrared range;

determining whether the picture obtained in one of the two ranges of radiation contains less than a predetermined amount of information; and computing three new tables of values to make a black-and-white display of the picture obtained in only one range of radiation if the picture obtained in the other range contains less than the predetermined amount of information.

* * * * *